No. 822,531. PATENTED JUNE 5, 1906.
L. P. LOWE.
PROCESS OF MANUFACTURING GAS.
APPLICATION FILED AUG. 24, 1905.

Witnesses
K. Lockwood Nevins.
Bessie Gorfinkel.

Inventor
L. P. Lowe
By F. M. Wright
Attorney

UNITED STATES PATENT OFFICE.

LEON P. LOWE, OF SAN FRANCISCO, CALIFORNIA.

PROCESS OF MANUFACTURING GAS.

No. 822,531. Specification of Letters Patent. Patented June 5, 1906.

Application filed August 24, 1905. Serial No. 275,534.

*To all whom it may concern:*

Be it known that I, LEON P. LOWE, a citizen of the United States, residing at San Francisco, in the county of San Francisco and State of California, have invented certain new and useful Improvements in Processes of Generating Heat from the Combustion of Oil, Especially for Gas-Making, of which the following is a specification.

This invention relates to an improved process of generating heat from the combustion of oil, and is especially applicable to the manufacture of combustible gas, although it may be used also for the generation of steam, the firing of kilns, or in any other manner in which oil is burned to generate heat.

For the purpose of illustrating my improved process I show herein an apparatus in which said process is used for the manufacture of combustible gas.

Figure 1:
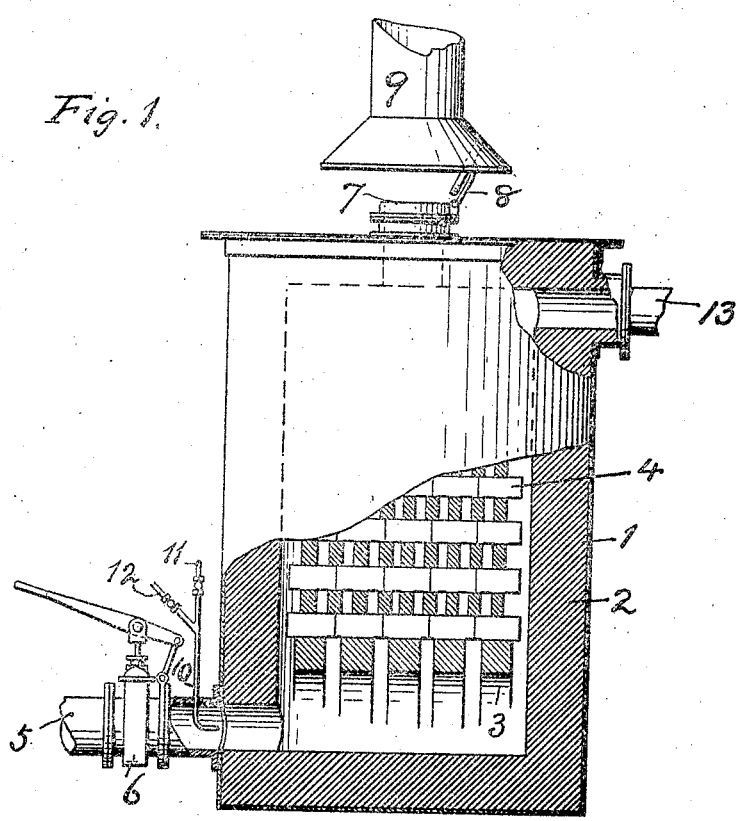
Figure 2:
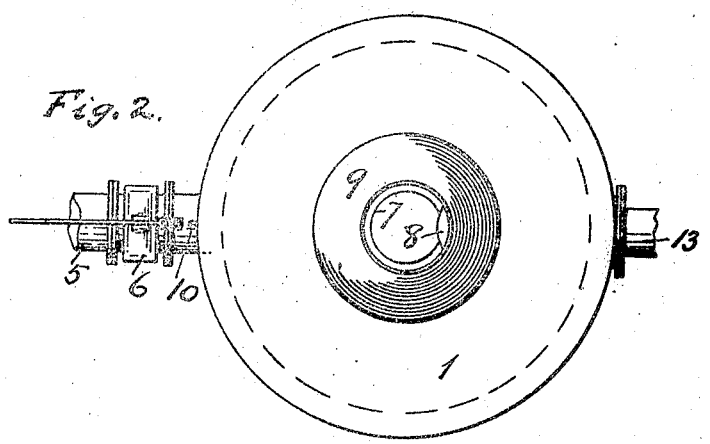

In the accompanying drawings, Figure 1 is a broken side elevation of the apparatus. Fig. 2 is a plan view thereof.

Referring to the drawings, 1 represents a casing lined with refractory material 2 and forming a chamber, in the lower portion of which are arranged arches 3, on which are supported loosely-piled bricks 4, said arches and bricks being of refractory material. Air is admitted to the bottom of said chamber by an air-pipe 5, controlled by a valve 6, and the products of combustion pass out by an outlet 7, controlled by a valve 8, and thus into a stack 9.

10 is a pipe discharging into the air-inlet and thence into the bottom of the chamber, said pipe having two branches 11 12, of which the branch 11 is used to admit oil and the branch 12 to admit a compressed gas used for carrying out my improved process. 13 is an outlet for the manufactured gas.

The process is as follows: The air-inlet 5, the oil-pipe 11, and the valve 8 being open, oil is admitted to the bottom of the chamber and is there burned, the products of combustion passing through the arches 3 and refractory material 4 and highly heating the same and out by the outlet 7 and the stack 9. When the refractory material in the chamber has been sufficiently heated, the air is excluded by closing the valve 6, and the valve 8 is also closed and the pipe 12 opened, thereby admitting a gas under pressure to spray the oil which continues to be admitted by the pipe 11, said oil so sprayed being passed through the highly-heated refractory material and being converted into fixed gas. When the temperature of the refractory material has been sufficiently lowered by this stage of the process, the valves 6 and 8 are opened, and air is thus again admitted to carry out the heating stage of the process. This may be done without closing the pipe 12.

The novelty of my invention consists in the character of the gas which is employed to spray the oil. Heretofore it has been customary to use steam for the purpose; but this necessitates the formation of water-gas, which in certain cases is objectionable, and, moreover, the amount of steam admitted is in excess of that required for the manufacture of water-gas. Consequently the surplus steam must be eliminated by means of scrubbers. Air has also been sometimes admitted for spraying the oil; but this is very objectionable, as it causes the resulting gas to be mingled with nitrogen and carbonic acid.

Now the essence of my invention consists in using instead of steam a gas which will not injuriously affect the gas produced from the oil, as do both steam and air. The gas which is so admitted is preferably a combustible gas and will generally be that previously made by the same apparatus which is being used, a portion of the gas so made being compressed and returned to the apparatus and there utilized to spray the oil. However, it is to be understood that my invention is not limited to the use of a gas previously manufactured in the selfsame apparatus, but includes any gas which by its admixture with oil does not injuriously affect the calorific and luminant properties thereof.

By the use of this apparatus boilers are rendered unnecessary, and thus the cost of erecting a gas plant is reduced, creating a wider field for the use of gas, and especially where steam under high pressure is objectionable.

I claim—

1. The process of manufacturing gas which consists in heating refractory material, then spraying oil by means of a compressed combustible gas and passing it through the refractory material to make gas so long as the temperature of said material remains sufficiently high, then admitting air to burn the oil and gas so admitted, and passing the products of combustion through refractory material to reheat the same, then shutting off the air and passing the oil, still sprayed by the compressed combustible gas, through the refractory material to make gas, and then repeating the above steps, substantially as described.

2. The process of manufacturing gas which consists in highly heating refractory material, compressing a portion of the gas previously manufactured, admitting a jet of said compressed gas to a stream of oil to spray the oil, then passing the sprayed oil and the gas mixed therewith through the refractory material to make gas therefrom, and repeating the operation indefinitely, substantially as described.

In witness whereof I have hereunto set my hand in the presence of two subscribing witnesses.

L. P. LOWE.

Witnesses:
FRANCIS M. WRIGHT,
BESSIE GORFINKEL.